(12) United States Patent
Zhang (10) Patent No.: US 9,007,200 B2
(45) Date of Patent: Apr. 14, 2015

(54) PROCESS METHOD AND APPARATUS FOR PREVENTING ALARM JITTER

(75) Inventor: Zhenlv Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 298 days.

(21) Appl. No.: 13/811,356

(22) PCT Filed: Nov. 15, 2010

(86) PCT No.: PCT/CN2010/078744
§ 371 (c)(1),
(2), (4) Date: Jan. 21, 2013

(87) PCT Pub. No.: WO2012/012986
PCT Pub. Date: Feb. 2, 2012

(65) Prior Publication Data
US 2013/0177310 A1    Jul. 11, 2013

(30) Foreign Application Priority Data

Jul. 28, 2010 (CN) .......................... 2010 1 0243019

(51) Int. Cl.
G08B 29/00 (2006.01)
H04L 1/20 (2006.01)
H04L 12/24 (2006.01)
H04L 12/26 (2006.01)

(52) U.S. Cl.
CPC ............ H04L 1/205 (2013.01); H04L 43/087 (2013.01); H04L 41/0627 (2013.01); H04L 41/0622 (2013.01)

(58) Field of Classification Search
CPC ........................ H04J 2203/006; H04L 45/28
USPC ................ 340/507; 714/48, 43; 370/216, 225
See application file for complete search history.

(56) References Cited

U.S. PATENT DOCUMENTS 7,602,699 B2 * 10/2009 Rajan et al. ................... 370/216

FOREIGN PATENT DOCUMENTS

| CN | 1645818 A | 7/2005 |
|---|---|---|
| CN | 101014179 A | 8/2007 |
| CN | 101141195 A | 3/2008 |
| CN | 101635659 A | 1/2010 |

OTHER PUBLICATIONS

International Search Report mailed on May 19, 2011 in PCT/CN2010/078744 in 2 pages.

* cited by examiner

*Primary Examiner* — Shirley Lu
(74) *Attorney, Agent, or Firm* — Knobbe, Martens, Olson & Bear, LLP (57) ABSTRACT

The disclosure provides a process method and apparatus for preventing an alarm jitter, which are applied to an ASON system. The method comprises: obtaining a time interval weight T between generation and recovery of an alarm of a device through a pretest (S202); comparing the time interval weight T with a predetermined standard time interval W of the device, and determining an alarm jitter processing policy to be adopted according to a magnitude relation between the time interval weight T and the standard time interval W, wherein the alarm jitter processing policy comprises performing a jitter preventing process for alarm information reported by a lower layer according to a priority and/or a type of an alarm (S204); and performing the jitter preventing process by using the alarm jitter processing policy (S206). The solution improves stability of a control plane, and increases flexibility and process capability of the system.

13 Claims, 9 Drawing Sheets

PROCESS METHOD AND APPARATUS FOR PREVENTING ALARM JITTER

CROSS-REFERENCE TO RELATED APPLICATIONS

This application is the U.S. National Phase application under 35 U.S.C. §371 of International Application PCT/CN2010/078744, filed Nov. 15, 2010, which claims priority to Chinese Application 201010243019.0, filed Jul. 28, 2010.

TECHNICAL FIELD

The disclosure relates to a field of optical network communications, and in particular to a process method and apparatus for preventing an alarm jitter.

BACKGROUND

An Automatic Switched Optical Network (ASON) is a new-generation optical transport network which is capable of implementing an optical network switching and interworking function intelligently and automatically. As a control plane, the ASON performs a lot of information interaction with a transport plane in a practical process of information transport. Alarm information, as a part of transported information, also plays a very important role. For example, the transport plane will instantly report the alarm information needed by the control plane to the ASON, so that the ASON triggers related continuous actions in a short time, thereby ensuring that the control plane can automatically perform control of the whole network.

However, if the transport plane jitters in the process of uploading the alarm information, then a lot of alarm information will be reported to the ASON in a short time. If the control plane does not process or release the alarm jitter information in time, then the alarm jitter information inevitably takes up resources of the control plane continually, which causes the processing exception of the control plane of the system, even the collapse of the whole system.

Figure 1:
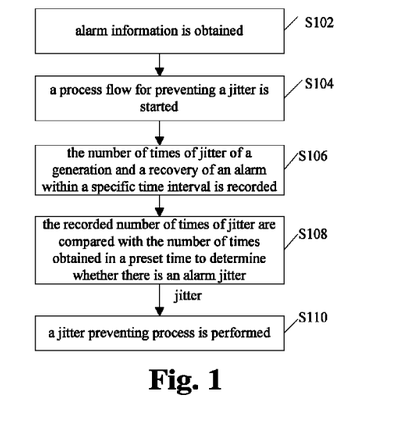
FIG. 1 shows a flowchart of a process method for preventing an alarm jitter according to related technologies.

FIG. 1 shows a flowchart of a process method for preventing an alarm jitter according to related technologies. As shown in FIG. 1, the method comprises the following steps:

Step S102: alarm information is obtained;

Step S104: a process flow for preventing a jitter is started; for example, after receiving the alarm information or after a system initialization, a jitter preventing mechanism is immediately started;

Step S106: the number of times of jitter of a generation and a recovery of an alarm within a specific time interval is recorded;

Step S108: the recorded number of times of jitter is compared with the number of times obtained in a preset time interval to determine whether there is an alarm jitter; namely, determine whether there is the alarm jitter according to the number of the generation and the recovery of the alarm; if there is the alarm jitter, enter Step S110;

Step S110: a jitter preventing process is performed.

The inventor finds that in the related technologies, directly starting the jitter preventing flow after the alarm generation may cause great waste of resources because of frequent use of timer and the like, and the applicable scenario and the alarm type able to be processed are relatively simple, there is insufficient consideration for the use of system sources, and the adaptability is bad especially for the ASON system.

SUMMARY

The disclosure provides a process solution for preventing an alarm jitter, so as to at least solve the problem of the related technologies that the applicability of the system is bad because the applicable scenario of the method for preventing the alarm jitter and the alarm type that the method can process are simple.

According to an aspect of the disclosure, a process method for preventing an alarm jitter is provided.

The process method for preventing the alarm jitter according to one aspect of the disclosure, which is applied to an ASON system, comprises: obtaining a time interval weight T between a generation and a recovery of an alarm of a device through a pretest; comparing the time interval weight T with a predetermined standard time interval W of the device, and determining an alarm jitter processing policy to be adopted according to a magnitude relation between the time interval weight T and the standard time interval W, wherein the alarm jitter processing policy comprises performing a jitter preventing process for alarm information reported by a lower layer according to a priority and/or a type of an alarm; and performing the jitter preventing process by using the alarm jitter processing policy.

Preferably, under a condition that the time interval weight T is greater than the standard time interval W, the alarm jitter processing policy comprises: after receiving a generation alarm or a recovery alarm reported by the lower layer, periodically detecting in a first preset time whether there is new alarm information, which is from a same source as the generation alarm or the recovery alarm, reported by the lower layer; if so, performing the jitter preventing process according to a priority and/or a type of the new alarm information; or else, not performing the jitter preventing process.

Preferably, under a condition that the time interval weight T is less than or equal to the standard time interval W, the alarm jitter processing policy comprises: calculating a time interval K between receiving a recovery alarm reported by the lower layer and receiving a next generation alarm; under a condition that the time interval K is less than the time interval weight T, determining that there is an alarm jitter in the device, and after determining that there is the alarm jitter, detecting in a second preset time whether there is new alarm information, which is from a same source as a generation alarm or the recovery alarm, reported by the lower layer; if so, performing the jitter preventing process according to a priority and/or a type of the new alarm information.

Preferably, the step of performing the jitter preventing process according to the priority and/or the type of the new alarm information comprises: when continuously receiving generation alarms or recovery alarms, which are from a same source and reported by the lower layer, with a same type, not reporting the generation alarms or the recovery alarms; when continuously receiving the generation alarms or the recovery alarms, which are from a same source and reported by the lower layer, with different priorities and different types, if the priority of the received new alarm information reported by the lower layer is higher than that of a generation alarm or a recovery alarm reported to an upper layer a previous time, reporting the new alarm information to the upper layer.

Preferably, the step of performing the jitter preventing process according to the priority and/or the type of the new alarm information further comprises: when receiving the recovery alarm which is from a same source as the generation alarm after receiving the generation alarm reported by the lower layer, after the detecting is finished, if the new alarm information, which is reported by the lower layer, received the last time is the generation alarm, reporting the new alarm information to an upper layer; if the new alarm information, which is reported by the lower layer, received the last time is the recovery alarm, reporting the new alarm information to the upper layer under a condition that the priority of the new alarm information is higher than that of the generation alarm or the recovery alarm reported to the upper layer a previous time; when receiving the generation alarm which is from a same source as the recovery alarm after receiving the recovery alarm reported by the lower layer, after the detecting is finished, if the new alarm information, which is reported by the lower layer, received the last time is the recovery alarm, reporting the new alarm information to the upper layer; if the new alarm information, which is reported by the lower layer, received the last time is the generation alarm, reporting the new alarm information to the upper layer under a condition that the priority of the new alarm information is higher than that of the generation alarm or the recovery alarm reported to the upper layer a previous time.

Preferably, the lower layer reports the alarm information in at least one of the following ways: the lower layer continuously reporting generation alarms or recovery alarms, which are from a same source, with a same type in a preset time interval; the lower layer continuously reporting the generation alarms or the recovery alarms, which are from the same source, with different priorities and different types in a preset time interval; the lower layer alternately reporting the generation alarm and the recovery alarm which are from the same source in a preset time interval.

A process apparatus for preventing an alarm jitter according to another aspect of the disclosure, applied to an ASON system, comprises: an obtaining module, which is configured to obtain a time interval weight T between a generation and a recovery of an alarm of a device through a pretest; a comparing module, which is configured to compare the time interval weight T with a predetermined standard time interval W of the device; a determining module, which is configured to determine an alarm jitter processing policy to be adopted according to a comparison result of the comparing module, wherein the alarm jitter processing policy comprises performing a jitter preventing process for alarm information reported by a lower layer according to a priority and/or a type of an alarm; and a jitter preventing module, which is configured to perform the jitter preventing process by using the alarm jitter processing policy determined by the determining module.

Preferably, under a condition that the time interval weight T is greater than the standard time interval W, the jitter preventing module comprises: a first detecting module, which is configured to, after receiving a generation alarm or a recovery alarm reported by the lower layer, periodically detect in a first preset time whether there is new alarm information, which is from a same source as the generation alarm or the recovery alarm, reported by the lower layer; if so, perform the jitter preventing process according to a priority and/or a type of the new alarm information; or else, not perform the jitter preventing process.

Preferably, under a condition that the time interval weight T is less than or equal to the standard time interval W, the jitter preventing module comprises: a calculating module, which is configured to calculate a time interval K between receiving a recovery alarm reported by the lower layer and receiving a next generation alarm; a deciding module, which is configured to, under a condition that the time interval K is less than the time interval weight T, decide that there is an alarm jitter in the device; a second detecting module, which is configured to, after deciding by the deciding module that there is the alarm jitter, detect in a second preset time whether there is new alarm information, which is from a same source as a generation alarm or the recovery alarm, reported by the lower layer; if so, perform the jitter preventing process according to a priority and/or a type of the new alarm information.

Preferably, being from the same source means being from a same port of a same single board.

Through the disclosure, by the way of adaptively performing an alarm jitter preventing process according to different types and priorities of alarms, the problem of the related technologies that the applicability of the system is bad because the applicable scenario of the method for preventing the alarm jitter and the alarm type that the method can process are simple is solved, the stability of the control plane is improved, and the flexibility and process capability of the system are increased.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure is described below with reference to the accompanying drawings and embodiments in detail. Note that, embodiments and features in embodiments in the application can be combined with each other on condition of not conflicting.

Figure 2:
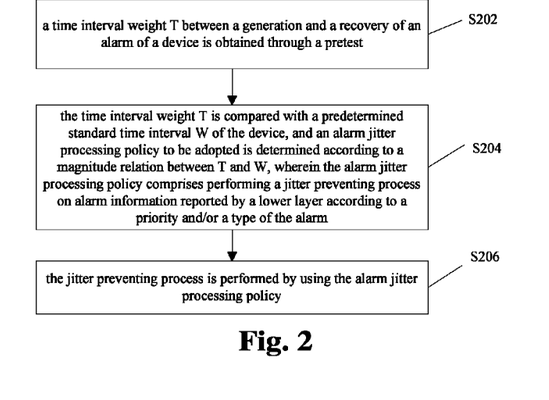
FIG. 2 shows a flowchart of a process method for preventing an alarm jitter according to an embodiment of the disclosure.

FIG. 2 shows a flowchart of a process method for preventing an alarm jitter according to an embodiment of the disclosure. As shown in FIG. 2, the method comprises the following steps:

Step S202: a time interval weight T between a generation and a recovery of an alarm of a device is obtained through a pretest;

Step S204: the time interval weight T is compared with a predetermined standard time interval W of the device, and an alarm jitter processing policy to be adopted is determined according to a magnitude relation between the time interval weight T and the standard time interval W, wherein the alarm jitter processing policy comprises performing a jitter preventing process for alarm information reported by a lower layer according to a priority and/or a type of an alarm; and Step S206: the jitter preventing process is performed by using the alarm jitter processing policy.

Through the embodiment of the disclosure, by the way of adaptively performing the process for preventing the alarm jitter according to different types and priorities of alarms, the problem of related technologies that the applicability of the system is bad because the applicable scenario of the method for preventing the alarm jitter and the alarm type that the method can process are simple is solved, the stability of the control plane is improved, and the flexibility and process capability of the system are increased.

Preferably, in Step S204, during a specific implementation, the step of determining the alarm jitter processing policy to be adopted according to the magnitude relation between the time interval weight T and the standard time interval W can comprise the following implementation ways.

Way 1: under a condition that the time interval weight T is greater than the standard time interval W, a policy A is adopted. Specifically, after receiving a generation alarm or a recovery alarm reported by the lower layer, the generation alarm or the recovery alarm is reported to an upper layer, and it is periodically detected in a preset time t1 whether there is new alarm information, which is from a same source (namely, a same port of a same single board) as the generation alarm or the recovery alarm reported to the upper layer a previous time, reported by the lower layer; if so, the jitter preventing process is performed according to a priority and/or a type of the new alarm information; or else, the jitter preventing process is not performed.

Way 2: under a condition that the time interval weight T is less than or equal to the standard time interval W, a policy B is adopted. Specifically, first a time interval K between receiving a recovery alarm reported by the lower layer and receiving a next generation alarm is calculated; under a condition that the time interval K is less than the time interval weight T, there is an alarm jitter in the device, a process of detecting in a preset time t2 whether there is new alarm information, which is from the same source as the generation alarm or the recovery alarm reported to the upper layer a previous time, reported by the lower layer is started; if so, the jitter preventing process is performed according to the priority and/or the type of the new alarm information.

Thus it can be seen that in the preferable embodiment, the Way 1 improves the applicability of the system by periodically detecting in the preset time t1 whether the alarm information reported by the lower layer is received to determine the generation of the alarm jitter. In the Way 2, it is first determined whether the time interval between the recovery alarm reported by the lower layer and the next generation alarm is less than the time interval weight T, if so, it is indicated that the device has a jitter, and then the process of detecting the alarm information reported by the lower layer is started, that is to say, the detection is started only when determining that the device has a jitter, which effectively saves the resources of the system and improves the performance of the system.

Note that, the preset time t1 and the preset time t2 can be decided by the time interval weight T during a specific implementation. For example, the preset time t1 and the preset time t2 are usually less than or equal to the time interval weight T.

Preferably, in Step S206, the step of performing the jitter preventing process by using the alarm jitter processing policy can specifically comprise the following several situations.

(1) When continuously receiving the generation alarms or the recovery alarms, which are from the same source and reported by the lower layer, with the same type, the generation alarms or the recovery alarms are not reported.

(2) When continuously receiving the generation alarms or the recovery alarms, which are from the same source and reported by the lower layer, with different priorities and different types, if the priority of the received new alarm information reported by the lower layer is higher than that of the generation alarm or the recovery alarm reported to the upper layer a previous time, the new alarm information is reported to the upper layer.

(3) When alternately receiving the generation alarm and the recovery alarm which are from the same source and reported by the lower layer, after the detecting in the preset time is completed, it is needed to determine a state of the new alarm information, which is reported by the lower layer, received the last time (e.g., whether it is the generation alarm or the recovery alarm). If the state is different from that of the alarm information reported to the upper layer a previous time (e.g., one is the generation alarm and the other is the recovery alarm), the new alarm information is reported to the upper layer. If they are the same (e.g., they are both the generation alarms or the recovery alarms), under a condition that they have the same priority and the same type, the new alarm information is not reported; under a condition that they have different priorities and different types, if the priority of the new alarm information, which is reported by the lower layer, received the last time is higher than that of the alarm information reported to the upper layer the previous time, the new alarm information is reported to the upper layer; if the priority of the new alarm information, which is reported by the lower layer, received the last time is lower than or equal to that of the alarm information reported to the upper layer the previous time, the new alarm information is not reported.

During a specific implementation, the situation (3) can be:

a: when receiving a recovery alarm which is from the same source as a generation alarm after receiving the generation alarm reported by the lower layer, after the detecting is completed, if the new alarm information, which is reported by the lower layer, received the last time is the generation alarm, the new alarm information is reported to the upper layer, if the new alarm information, which is reported by the lower layer, received the last time is the recovery alarm, the new alarm information is reported to the upper layer under a condition that the priority of the new alarm information is higher than that of the generation alarm or the recovery alarm reported to the upper layer a previous time;

b: when receiving the generation alarm which is from the same source as the recovery alarm after receiving the recovery alarm reported by the lower layer, after the detecting is completed, if the new alarm information, which is reported by the lower layer, received the last time is the recovery alarm, the new alarm information is reported to the upper layer, if the new alarm information, which is reported by the lower layer, received the last time is the generation alarm, the new alarm information is reported to the upper layer under a condition that the priority of the new alarm information is higher than that of the generation alarm or the recovery alarm reported to the upper layer a previous time.

In the preferable embodiment, the alarm information, which is reported by the lower layer, received in the preset time is analyzed in detail, and the corresponding jitter preventing processing policy is provided, which improves the adaptability and processing capacity of the system.

Preferably, the lower layer reports the alarm information in at least one of the following ways: the lower layer continuously reports the generation alarms or the recovery alarms, which are from the same source, with the same type in a preset time interval; the lower layer continuously reports the generation alarms or the recovery alarms, which are from the same source, with different priorities and different types in a preset time interval; and the lower layer alternately reports the generation alarm and the recovery alarm which are from the same source in a preset time interval. The method is simple to implement and easy to operate.

Figure 3:
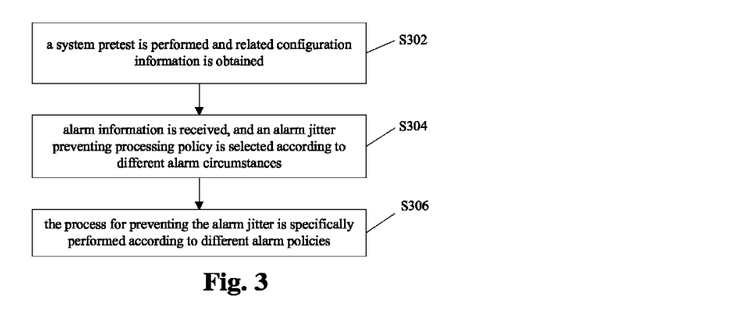
FIG. 3 shows a flowchart of a process method for preventing an alarm jitter according to a preferable embodiment of the disclosure.

FIG. 3 shows a flowchart of a process method for preventing an alarm jitter according to a preferable embodiment of the disclosure. As shown in FIG. 3, the method comprises the following steps.

Step S302: a pretest of a system is performed and related configuration information is obtained. Specifically, after determining information such as a basic configuration of a circumstance, the pretest of the system is performed, a time interval between alarm generation and alarm recovery is determined by a certain way, and a weight time (i.e., the time interval weight T between the generation and the recovery of the alarm of the device, as a time reference) is obtained through the pretest.

Step S304: alarm information is received, and an alarm jitter preventing processing policy is selected according to different alarm circumstances. Specifically, the specific jitter preventing processing policy can be decided according to jitter preventing adaptive pretest data of the system, and the system automatically decides the process flow for preventing jitter after an alarm circumstance is selected adaptively.

During a specific implementation, the process of deciding the jitter preventing processing policy according to the jitter preventing adaptive pretest data of the system can be: the obtained weight time is compared with a self-defined jitter preventing standard time interval of the system (i.e., the predetermined standard time interval W of the device), if the weight time is greater than the self-defined standard time interval of the system, the system automatically selects a jitter preventing policy A to process; if the weight time is less than or equal to the self-defined standard time interval of the system, the system automatically selects a jitter preventing policy B to process. After the system decides to select which jitter preventing processing policy, the jitter preventing system receives the alarm information of a transport plane during a normal service processing.

Note that, once deciding to use which jitter preventing policy in the pretest, the system no longer changes the jitter preventing processing policy randomly, and does not determine a reference weight time unless the device is restarted the next time.

If the policy A is selected, namely, the obtained jitter preventing pretest time interval value (i.e., the time interval weight T between the generation and the recovery of the alarm of the device) is greater than the self-defined jitter preventing time value of the system (i.e., the predetermined standard time interval W of the device), the system first reports the generation alarm information after receiving the generation alarm information, and then starts the jitter preventing flow (i.e., starts timing of a jitter preventing time). In addition, in order to periodically detecting the alarm information reported by the lower layer in the jitter preventing time, it is also needed to determine the number of predetermined timing of a timer and an initial value of a counter according to the weight time. For example, if the obtained time weight is 3 seconds, under a condition of selecting the policy A, it can be obtained according to the time weight that the corresponding number of predetermined timing of the timer (e.g., the duration of the timer is 1 second) is 3, and the initial value of the counter is 3, when the timer expires each time, 1 is subtracted from the value of the counter until the value of the counter is 0, and then the detecting is ended.

If the policy B is selected, namely, the obtained jitter preventing pretest time interval value T is less than or equal to the self-defined jitter preventing time value W of the system, after the system receives a recovery alarm and the next generation alarm, the time interval K is obtained. When the time interval K is greater than the pretest time weight T, the jitter preventing mechanism is not started, the system waits for the next recovery alarm and the corresponding generation alarm, and then obtains a time interval K; when the interval K is less than the pretest time weight T, the jitter preventing processing mechanism is started.

Step S306: the process for preventing the alarm jitter is specifically performed according to different alarm policies. Namely, the received alarm information reported by the lower layer is processed according to the different process flows. Specifically, different jitter preventing processing can be performed according to different situations of the reported alarm information. In the step, the alarm information reported by the lower layer mainly comprises the following several situations: continuously reporting the generation alarms or the recovery alarms with a same type; reporting the generation alarms or the recovery alarms with different priorities; alternatively reporting different alarm actions (i.e., the generation alarm and the recovery alarm). The several situations are described below in detail.

During a specific implementation, for either the policy A or the policy B, when the reported alarm information belongs to the continuous and same alarm actions (i.e., the generation alarm or the recovery alarm), and the alarm types are the same, after receiving the alarm information for the first time, the system reports this information to an upper module; after receiving the same alarm information for the second time, the system no longer performs reporting processing. When the reported alarm information has different types and priorities, if the system reports the alarm information with a low priority for the first time, and receives the alarm information with a high priority and the same key value (i.e., from the same source, which means from the same port of the same single board) after the jitter preventing report, it reports the recovery alarm with the high priority while deleting the alarm information with the low priority saved a previous time and storing this alarm information with the high priority. In this way, if there is alarm information with the same key value to be reported again, if its priority is lower than or equal to that of the stored alarm information, the system still does not report the subsequent continuous alarm information.

Figure 4:
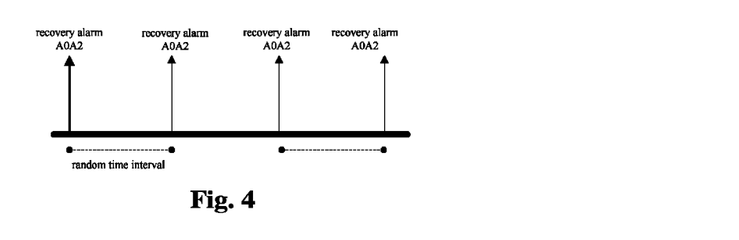
FIG. 4 shows a schematic diagram of continuously reporting recovery alarms with a same key value by a lower layer according to a preferable embodiment of the disclosure.

FIG. 4 is a schematic diagram of continuously reporting recovery alarms with the same key value by the lower layer according to a preferable embodiment of the disclosure. As shown in FIG. 4, it is a jitter preventing processing situation when the lower layer continuously reports the recovery alarms with the same key value.

Figure 5:
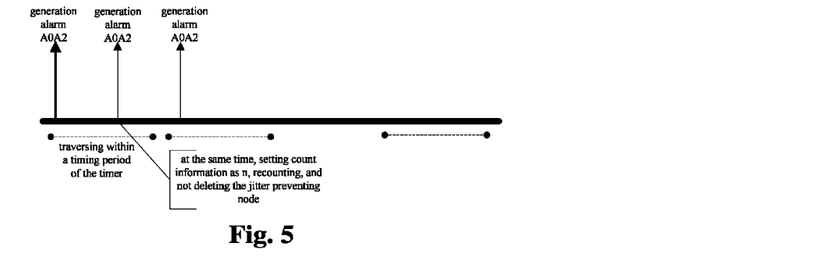
FIG. 5 shows a schematic diagram of continuously reporting generation alarms with the same key value by the lower layer according to a preferable embodiment of the disclosure.

FIG. 5 shows a schematic diagram of continuously reporting generation alarms with the same key value by the lower layer according to a preferable embodiment of the disclosure. There is such an abnormal condition of continuously generating alarms in the system. After the alarm is generated, the system enters a jitter preventing process. Specifically, in a jitter preventing determination time of a node (a key value node), if no exception occurs, the system first deletes the jitter preventing node, but if the generation alarm with the same key value occurs later, the system judges whether this alarm information is the same as last recorded information, if so, the system directly filters out the generation alarm information while not enabling a jitter preventing related timing function, thereby saving resources used by the system.

Preferably, for the policy A (after the system has decided to use the policy A in the pretest, it does not execute the steps related to the policy B any more), as shown in FIG. 5, when the generation alarms with the same key value are continuously reported in the system in a cycle timing, after receiving one generation alarm for the first time, the system reports the alarm information in time while starting a jitter preventing cycle timer. If the system is in the policy A state currently, when exception occurs in the lower system (i.e., when continuously reporting the generation alarms with the same type), after starting the jitter preventing process, the system traverses the node of same key value in each determined time to observe whether there is abnormal alarm information occurring in the period of jitter preventing. In the process of n times of traversing (1 is subtracted from the count value of the counter after each traversing, wherein the value of n can be determined by the weight time), when the generation alarm with the same key value occurs, the system does not report the generation alarm, at the same time, the system makes the counter recount and makes the cycle timer circularly traverse again.

Figure 6:
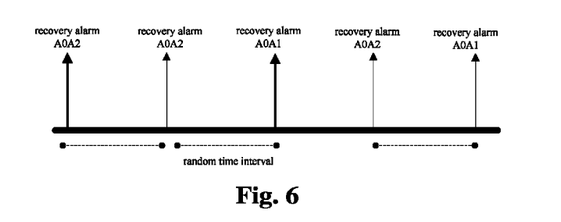
FIG. 6 shows a schematic diagram of reporting recovery alarms with the same key value and different priorities by the lower layer according to a preferable embodiment of the disclosure.

FIG. 6 shows a schematic diagram of reporting recovery alarms with the same key value and different priorities by the lower layer according to a preferable embodiment of the disclosure. As shown in FIG. 6, it is a jitter preventing processing situation when the lower layer reports the recovery alarms with the same key value and with different priorities and different types.

Figure 7:
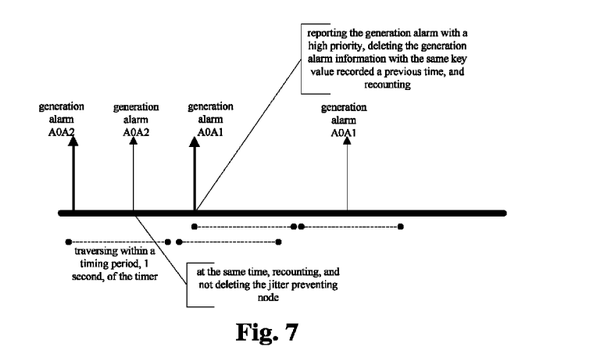
FIG. 7 shows a schematic diagram of reporting generation alarms with the same key value and different priorities by the lower layer according to a preferable embodiment of the disclosure.

FIG. 7 shows a schematic diagram of reporting generation alarms with the same key value and different priorities by the lower layer according to a preferable embodiment of the disclosure. As shown in FIG. 7, when the lower layer continuously reports the abnormal generation alarms, if the alarm types and the priorities of the generation alarms are different, under the jitter preventing mechanism, after the generation alarm with a higher priority occurs, the jitter preventing system reports the alarm information once while recounting this information, and the count value is reset as n. If the generation alarm with a low priority or an equal priority which is reported by the lower layer is received the next time, the system does not report the generation alarm.

The difference between the policy A and the policy B is described below in detail.

Figure 8:
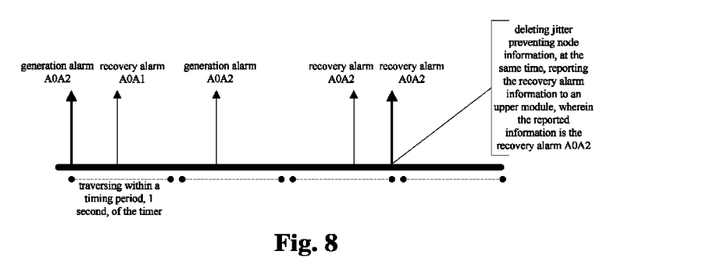
FIG. 8 shows a schematic diagram of alternately reporting a generation alarm and a recovery alarm by the lower layer in a cycle timing under a policy A according to a preferable embodiment of the disclosure.

FIG. 8 shows a schematic diagram of alternately reporting a generation alarm and a recovery alarm by a lower layer in a cycle timing under the policy A according to a preferable embodiment of the disclosure. As shown in FIG. 8, in the policy A, when the lower layer alternately reports the generation alarm and the recovery alarm, the jitter preventing process of the policy A can comprise the following steps.

Step S802: after the lower layer reports the generation alarm, the system reports the generation alarm information and stores the generation alarm information in an alarm jitter preventing table while starting a cycle timer to perform traversal detection and counting.

Step S804: in the process of traversing, if the recovery alarm information with the same key value occurs, it is indicated that there is jitter occurring during an alarm reporting of the lower layer, then the system records the alarm information to a current state information value of the node (the same key value) in the jitter preventing storage structure as temporary information. Specifically, in the process of self-defined n times of traversing, the temporary information recorded a previous time is recorded again if the alarm information with the same key value occurs until the traversing of this node is ended.

Step S806: after the traversing of the key value information in the jitter preventing storage structure is ended, the finally recorded temporary information of the node is compared with information of the node which reports the key value a previous time. If an alarm state (i.e., the generation alarm and the recovery alarm) changes, the system reports the alarm information whether an alarm type (comprising the alarm priority) changes or not while deleting this alarm jitter preventing node information.

Figure 9:
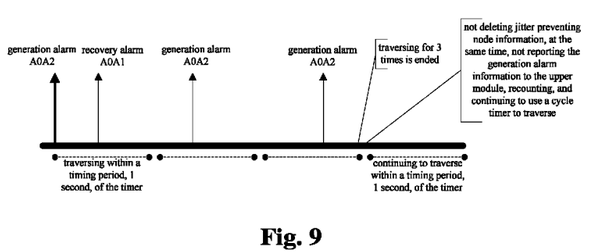
FIG. 9 shows a schematic diagram of reporting the same alarms to an upper layer at last under the policy A according to a preferable embodiment of the disclosure.
Figure 10:
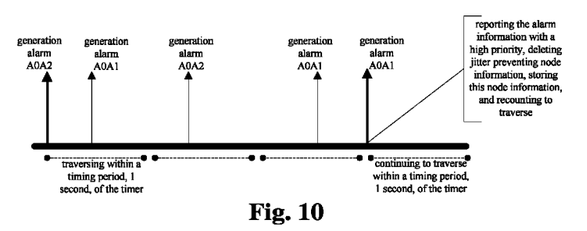
FIG. 10 shows a schematic diagram of reporting alarms with a high priority to the upper layer at last under the policy A according to a preferable embodiment of the disclosure.

In the step S806, if the alarm state (i.e., the generation alarm and the recovery alarm) does not change, and it is still the generation alarm at this time, then it is needed to observe the type of the generation alarm. If the alarm state belongs to the generation alarm with the same priority and the same type, no processing or reporting is performed, the related jitter preventing information is not deleted, recounting is performed and a count value is set as n, see FIG. 9 which shows a schematic diagram of reporting the same alarm to the upper layer at last under the policy A according to the preferable embodiment of the disclosure. If the alarm state belongs to the generation alarm with a different priority and a different type, the system decides according to the level of priority, that is to say, if the level of priority in a temporary variable is higher than that of the alarm information reported by the lower layer a previous time, the alarm information is reported this time, see FIG. 10 which shows a schematic diagram of reporting an alarm with high priority to the upper layer at last under the policy A according to the preferable embodiment of the disclosure. If the level of priority is lower than that of the alarm reported a previous time, no processing or reporting is performed, the jitter preventing node is not deleted, and recounting is performed.

Figure 11:
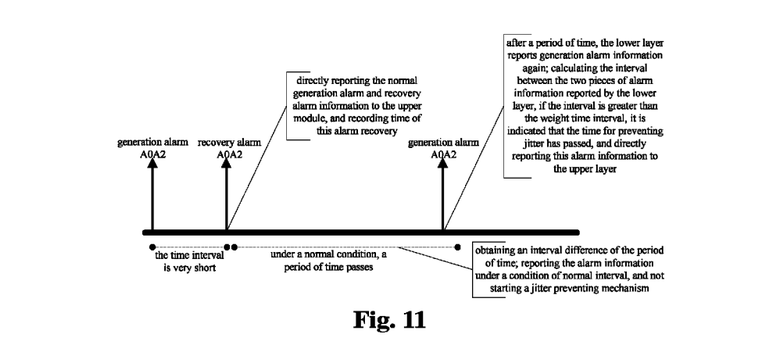
FIG. 11 shows a schematic diagram of reporting normal alarm information to the upper layer under a policy B according to a preferable embodiment of the disclosure.

FIG. 11 shows a schematic diagram of reporting normal alarm information to the upper layer under the policy B according to a preferable embodiment of the disclosure. As shown in FIG. 11, because an interval frequency between the generation alarm and the recovery alarm in the policy B is very short, if jitter preventing related resources (such as a timer and a counter) are started immediately after the alarm occurs, then a lot of resources of an operating system are bound to be spent for the system with a very short time interval. So, in the policy B (after a pretest system has decided to use the policy B, it does not execute the steps related to the policy A any more), the jitter preventing process is started only under a condition of determining that an alarm jitter problem occurs; while under a normal condition, the jitter preventing process is not started. Specifically, when the alarm information received by the system is the generation alarm and the recovery alarm alternately reported by the lower layer, the jitter preventing process of the policy B can comprise the following steps.

Step S1102: after the lower layer reports the recovery alarm, time of the alarm recovery is recorded, at the same time, information of the recovery alarm is reported to an upper module in time. Under a normal condition, a time interval between the recovery alarm and the generation alarm is recorded. Specifically, under a condition that the system operates normally (under most conditions), normal operation of the system and reporting of the alarm information are not influenced.

Figure 12:
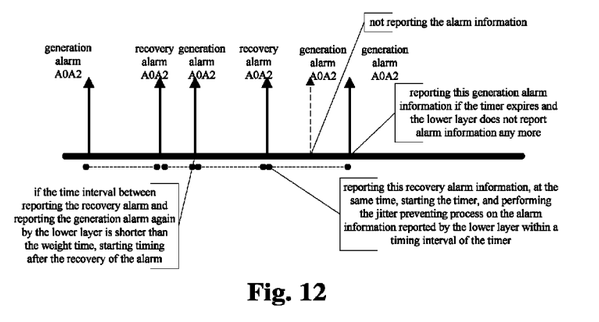
FIG. 12 shows a schematic diagram that a time interval between recovery and generation of an alarm is shorter than a weight time under the policy B according to a preferable embodiment of the disclosure.

Step S1104: under a condition that an alarm jitter of the system occurs (namely, when the time interval between reporting the recovery alarm and subsequently reporting a generation alarm by the lower layer is shorter than the weight time), which is mostly an abnormal condition, the timer is started. Specifically, see FIG. 12 which shows a schematic diagram that the time interval between the recovery and the generation of the alarm is shorter than the weight time under the policy B according to the preferable embodiment of the disclosure, in the solution, a timing interval of the timer can be a time interval of the pretest, for example, under a condition that an exception occurs, timing of 1 second is set only after the recovery alarm is received each time.

Figure 13:
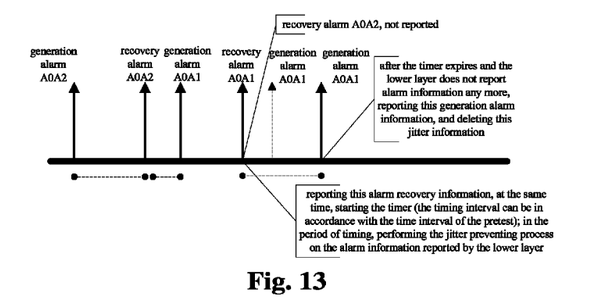
FIG. 13 shows a schematic diagram of reporting recovery alarms with a high priority to the upper layer at last under the policy B according to a preferable embodiment of the disclosure.
Figure 14:
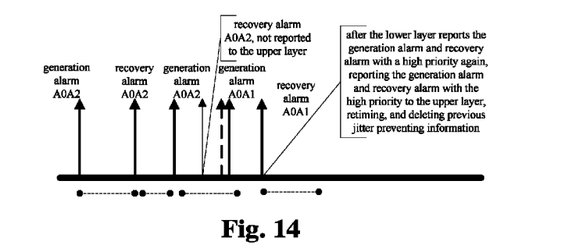
FIG. 14 shows a schematic diagram of reporting generation alarms with a high priority to the upper layer at last under the policy B according to a preferable embodiment of the disclosure.

Step S1106: if there is a recovery alarm with a higher priority or another type (a different alarm type) occurring in the period of timing, content of the previous recovery alarm is replaced by content of the current recovery alarm, and the corresponding information is reported until the timer expires, see FIG. 13 which shows a schematic diagram of reporting the recovery alarm with a high priority to an upper layer at last under the policy B according to the preferable embodiment of the disclosure. If there is a generation alarm with a higher priority (a different alarm type) occurring in the period of timing, it is needed to report the generation alarm information and corresponding recovery alarm information in time, delete previous alarm jitter preventing information, and restart the timer to record after the recovery alarm is generated; if the generation alarm information with a low priority occurs again during the period, no reporting is performed, see FIG. 14 which shows a schematic diagram of reporting the generation alarm with a high priority to the upper layer at last under the policy B according to the preferable embodiment of the disclosure.

Figure 15:
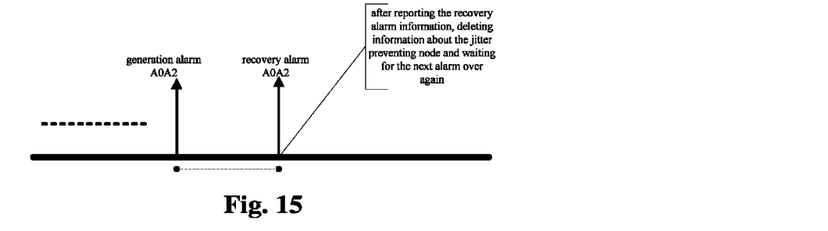
FIG. 15 shows a schematic diagram of no longer reporting jitter alarm information to the upper layer at last under the policy B according to a preferable embodiment of the disclosure.

Step S1108: once the jitter preventing function is started, it is needed to record the generation alarm or the recovery alarm reported by the lower layer in the key value at any time. After the recovery of the alarm, if the time interval between the recovery alarm and the generation alarm reported by the lower layer again is the weight time, and after the recovery of the generation alarm, if the lower layer does not report any generation alarm in the record time of the timer, then first the latest recovery alarm information recorded in the key value is reported, at the same time, the jitter preventing information is deleted and the process flow for preventing jitter is ended, and wait for the next alarm information processing, see FIG. 15 which shows a schematic diagram of no longer reporting jitter alarm information to the upper layer at last under the policy B according to the preferable embodiment of the disclosure.

It can be seen that the preferable embodiment provides a process method for preventing a jitter that can be adopted in the ASON system under a condition that there is an alarm jitter when receiving the alarm information reported by a single board of the transport plane, which effectively avoids the alarm jitter information reported to the ASON by the transport plane, thereby ensuring that the ASON filters out useless or abnormal alarm information when receiving the alarm information to enable the control plane to operate stably.

Figure 16:
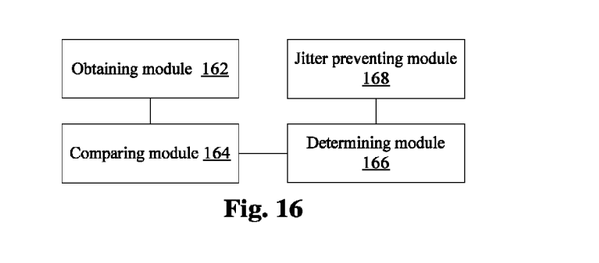
FIG. 16 shows a structural block diagram of a process apparatus for preventing an alarm jitter according to an embodiment of the disclosure.

FIG. 16 shows a structure diagram of a process apparatus for preventing an alarm jitter according to an embodiment of the disclosure. As shown in FIG. 16, the apparatus comprises: an obtaining module 162, which is configured to obtain a time interval weight T between a generation and a recovery of an alarm of a device through a pretest; a comparing module 164, which is coupled to the obtaining module 162 and configured to compare the time interval weight T with a predetermined standard time interval W of the device; a determining module 166, which is coupled to the comparing module 164 and configured to determine an alarm jitter processing policy to be adopted according to a comparison result of the comparing module 164, wherein the alarm jitter processing policy comprises performing a jitter preventing process on alarm information reported by a lower layer according to a priority and/or a type of an alarm; and a jitter preventing module 168, which is coupled to the determining module 166 and configured to perform the jitter preventing process by using the alarm jitter processing policy determined by the determining module 166.

Through the embodiment of the disclosure, by the way of adaptively performing the process for preventing the alarm jitter according to different types and priorities of alarms, the problem of the related technologies that the applicability of the system is bad because the applicable scenario of the method for preventing the alarm jitter and the alarm type that the method can process are simple is solved, the stability of the control plane is improved, and the flexibility and process capability of the system are increased.

Figure 17:
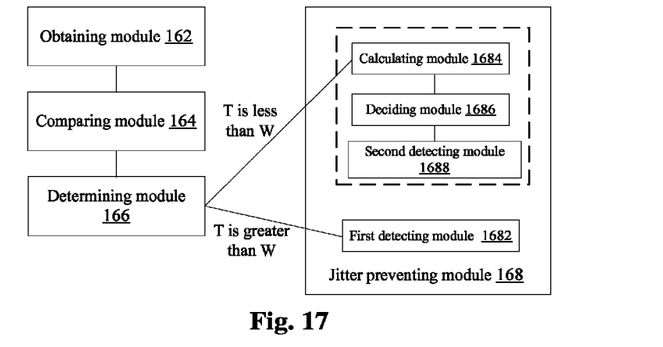
FIG. 17 shows a structural block diagram of the process apparatus for preventing the alarm jitter according to a preferable embodiment of the disclosure.

FIG. 17 shows a structure diagram of the process apparatus for preventing the alarm jitter according to a preferable embodiment of the disclosure. As shown in FIG. 17, under a condition that the time interval weight T is greater than the standard time interval W, the jitter preventing module 168 comprises: a first detecting module 1682, which is configured to, after receiving a generation alarm or a recovery alarm reported by the lower layer, periodically detect in a first preset time whether there is new alarm information, which is from a same source as the generation alarm or the recovery alarm, reported by the lower layer; if so, perform the jitter preventing process according to a priority and/or a type of the new alarm information; or else, not perform the jitter preventing process.

Under a condition that the time interval weight T is less than or equal to the standard time interval W, the jitter preventing module 168 comprises: a calculating module 1684, which is configured to calculate a time interval K between receiving the recovery alarm reported by the lower layer and receiving a next generation alarm; a deciding module 1686, which is coupled to the calculating module 1684 and configured to, under a condition that the time interval K is less than the time interval weight T, decide that there is an alarm jitter in the device; a second detecting module 1688, which is coupled to the deciding module 1686 and configured to, after deciding by the deciding module 1686 that there is the alarm jitter, detect in a second preset time whether there is new alarm information, which is from a same source as the generation alarm or the recovery alarm, reported by the lower layer; if so, perform the jitter preventing process according to a priority and/or a type of the new alarm information.

Preferably, being from the same source means being from a same port of a same single board.

In the preferable embodiment, it is feasible to adaptively select different alarm circumstances aiming at different alarm characteristics (time delay, frequency and so on) in different hardware systems, thereby ensuring to correctly process the alarm.

The implementation process of embodiments of the disclosure is described below with reference to examples in detail.

Example 1

Figure 18:
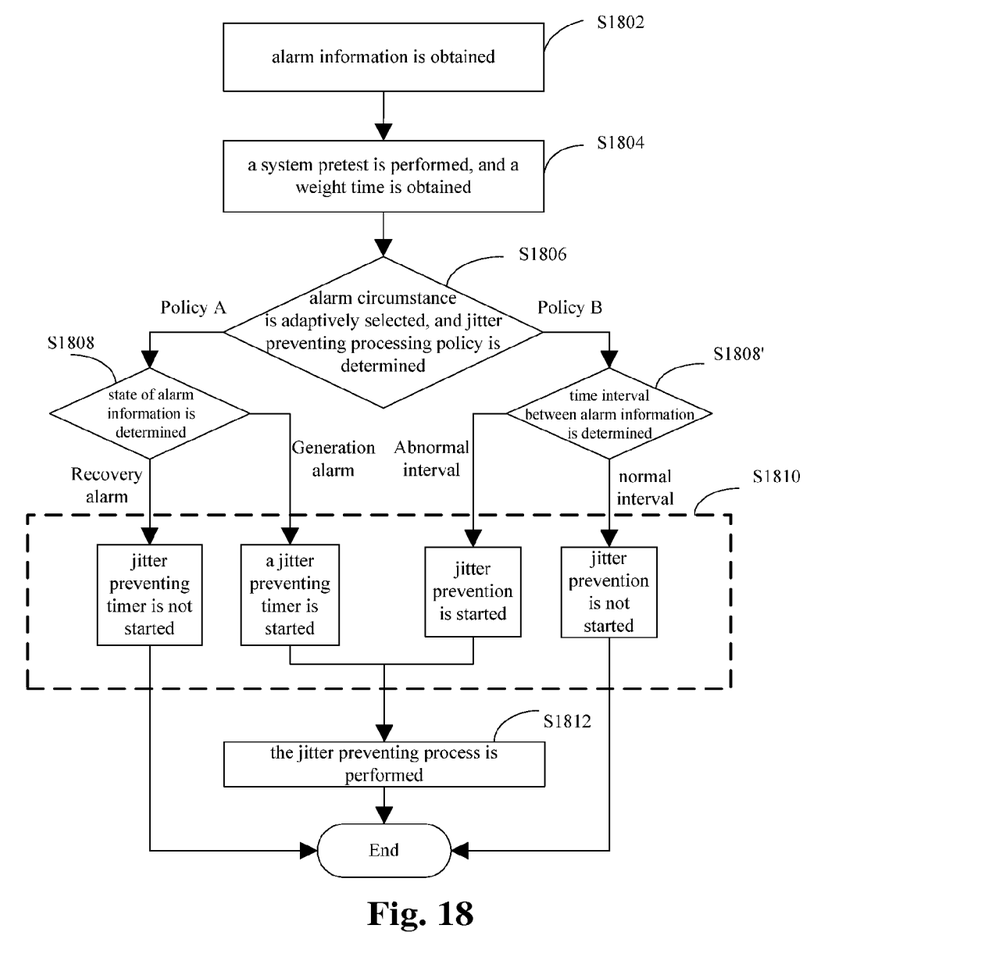
FIG. 18 shows a flowchart of a process method for preventing an alarm jitter according to example 1 of the disclosure.

FIG. 18 shows a flowchart of a process method for preventing an alarm jitter according to example 1 of the disclosure. As shown in FIG. 18, the method comprises the following steps.

Step S1802: alarm information is obtained. During a specific implementation, a network element is first built, a wavelength division network element is set up, an ASON device is started after fiber equipment is successfully connected, and an alarm reporting pretest is ready to be performed after the ASON is successfully started.

Step S1804: a system pretest is performed to obtain a weight time, namely, a pretest analysis is performed to the time interval between reporting a generation alarm and reporting a recovery alarm by a single board of a pretest network element. For example, it is feasible to obtain the time interval weight T between the generation and the recovery of the alarm by the way of using a test instrument or sending a self-defined command line after pulling up and then reconnecting an optical fiber connected to a certain port on the single board. The example 1 obtains the time interval between reporting the generation alarm and reporting the recovery alarm by the single board this time by performing an operation of sending a command line twice. The pretest can be performed for M (M is 20-100) times in the similar way, and the test is performed for 50 times by using command lines in the example.

Step S1806: an alarm circumstance is adaptively selected, and a jitter preventing processing policy is determined. For example, in the Step S1804, after receiving pretest information for 50 times, the information is stored in a jitter preventing storage data structure, and the information is automatically compared with a set jitter preventing standard value (i.e., the predetermined standard time interval W of the device) after the pretest information is received for a certain times, and then the jitter preventing system decides which flow (i.e., which jitter preventing processing policy) is adopted. During a specific implementation, if the time interval weight T is greater than the standard time interval W, the policy A is adopted; if the time interval weight T is less than or equal to the standard time interval W, the policy B is adopted.

Step S1808: determination is performed for alarm information reported by the lower layer. If the policy A is adopted, then the state of the alarm information (i.e., the generation alarm or the recovery alarm) is determined; if the policy B is adopted, the time interval between two pieces of the alarm information is determined.

Step S1810: corresponding processing is performed according to the determination result. Specifically, in the policy A, if it is determined that what is reported by the lower layer is the recovery alarm, the jitter preventing timer is not started, and the jitter preventing process is not performed; if it is determined that what is reported by the lower layer is the generation alarm, the jitter preventing timer is started, and then enter Step S1812. In the policy B, when it is determined that the time interval (i.e., the time interval between the recovery alarm and the next generation alarm) of two pieces of the alarm information reported by the lower layer is less than T, which means the interval is abnormal, the jitter preventing timer is started, and then enter Step S1812; when it is determined that the time interval between the two pieces of the alarm information reported by the lower layer is greater than or equal to T, which means the interval is normal, the jitter preventing process is not performed.

Step S1812: the jitter preventing process is performed.

It can be seen from example 1 that the jitter preventing method presented by the system can adaptively select a targeted jitter preventing policy effectively according to different alarm circumstances, and then process the alarm jitter. The system will record necessary information in time according to the jitter situation, which improves the fault-tolerance capability and stability of the ASON system. Besides, different processing policies can be presented aiming at different systems, thereby saving the performance of the operating system to a large extent, and enabling the system to always operate in a high-efficient and stable environment.

Example 2

In the Step S1806, after comparing the weight time T with the self-defined weight W of the jitter preventing system, if T is greater than W, the policy A is adopted to perform the jitter preventing process. Specifically, the weight time T can be obtained through the 50 times of pretest in the Step S1804. The way of obtaining the number of counting times is dividing the weight time T by its integral multiple, and an obtained decimal part is rounded, note that, it must ultimately be an integer value. For example, if the time interval T between the generation and the recovery of the alarm of the system is 3 seconds, then a timer with a cycle timing period of 1 second is adopted, the counting initial value is 3, and traversing is performed for 3 times.

Figure 19:
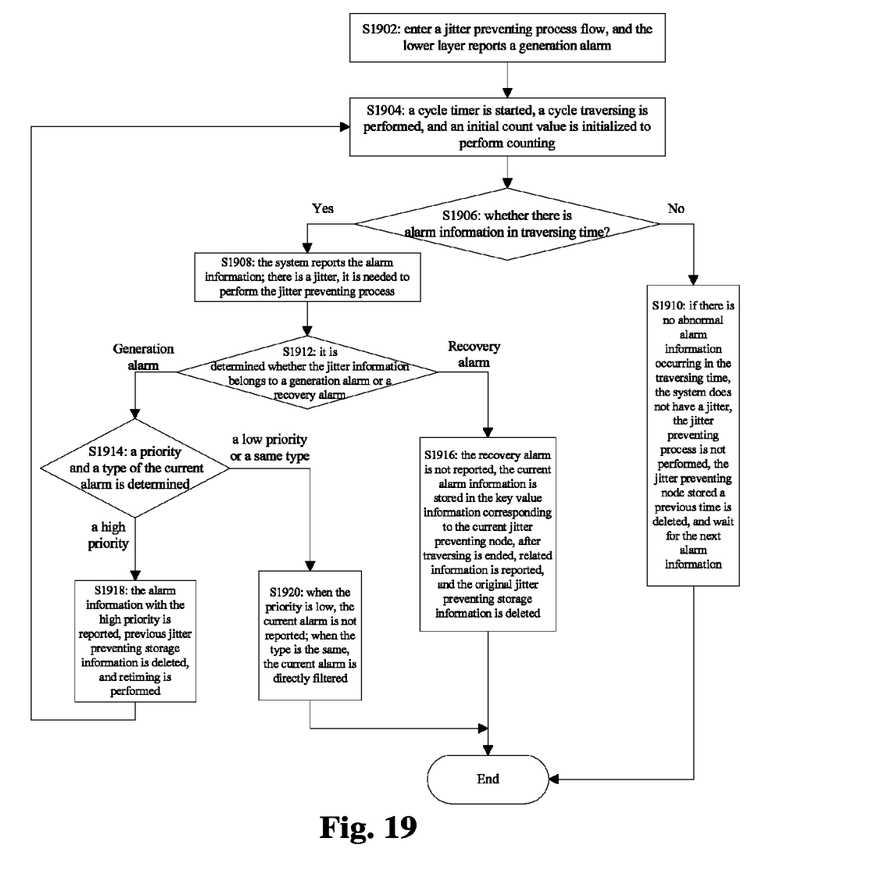
FIG. 19 shows a flowchart of a process for preventing a jitter under the policy A according to example 2 of the disclosure.

FIG. 19 shows a flowchart of a jitter preventing process under the policy A according to example 2 of the disclosure. As shown in FIG. 19, the flow comprises the following steps. After the single board reports a generation alarm, the system reports the alarm information to the upper module while starting a jitter preventing process and starting a cycle timer of the system to perform a cycle traversing every 1 second. In the process of the cycle traversing, if the system receives a piece of recovery alarm information from the same port of the same single board, the recovery alarm information is first stored in a chain table (each node in the chain table represents the stored recovery alarm information), and the related information is not reported until the traversing is ended; if the port reports a generation alarm again, and the type priority of the generation alarm is higher than the priority of the alarm reported just now, the jitter preventing node is deleted, the generation alarm information is reported, and the jitter preventing timer is reset to perform retiming. For example, in the process of cycle traversing of the timer, after the port of the single board receives a piece of recovery alarm information again, the system pre-stores the recovery information as well in stead of reporting the recovery information; after a recovery alarm with a high priority is received again, the system replaces the previous recovery information with this recovery alarm information in stead of reporting. In the solution, each cycle traversing decreases the count value; until the count value is decreased to 0, the pre-stored alarm information from the port of the single board is reported, information about the jitter preventing node is deleted, and the jitter preventing system waits for the next alarm information.

It can be seen that the process method for preventing the jitter in the above example has an adaptive selecting feature. According to the determination of the time interval between the generation and the recovery of the alarm made by different systems, the jitter preventing system will automatically identify and select different process flows, namely, the whole flow selection of the system can be completely automated through the pretest. Besides, the jitter preventing process can be performed according to different types and different priorities of alarms respectively, which improves the flexibility and the applicability of the system.

Example 3

In the Step S1806, after comparing the weight time T with the self-defined weight W of the jitter preventing system, if T is less than or equal to W, the policy B is adopted to perform the jitter preventing process. If the policy B is adopted, after the weight time T is determined, the jitter preventing process is performed only after a jitter situation occurs.

Figure 20:
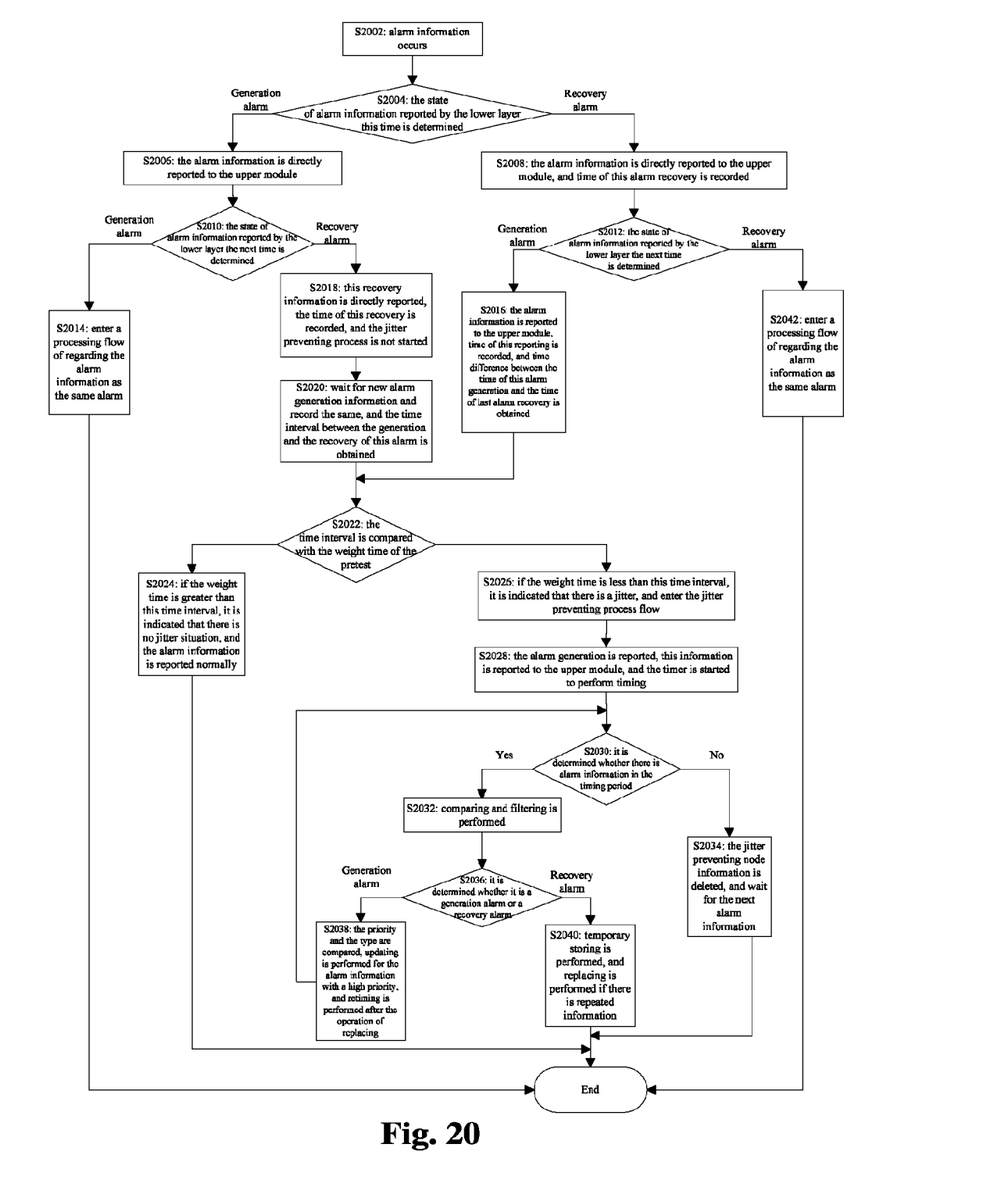
FIG. 20 shows a flowchart of a process for preventing a jitter under the policy B according to example 3 of the disclosure.

FIG. 20 shows a flowchart of a jitter preventing process under the policy B according to example 3 of the disclosure. As shown in FIG. 20, the flow comprises the following steps. The time interval between receiving the recovery alarm reported by the lower layer and receiving the next generation alarm is first calculated. Under a condition that the time interval is less than the weight time, it is determined that there is an alarm jitter, at this time, the jitter preventing process of the policy B is started. Specifically, a timer is started to perform timing, and it is detected whether there is alarm information reported by the lower layer in the timing period; if there is alarm information reported by the lower layer in the timing period, the state (i.e., the generation alarm or the recovery alarm) of the alarm information is determined, and the jitter preventing process is performed according to the state, and the priority and/or the type of the alarm information. For example, if the state is the generation alarm, it is needed to compare its priority and type with that of the stored node information, updating is performed for the alarm information with a high priority, and retiming is performed; if the state is the recovery alarm, this alarm information is stored, and replaced if there is repeated information. If there is no alarm information reported by the lower layer in the timing period, information about this jitter preventing node is deleted, and the system waits for the next alarm information.

In example 3, the policy B is set aiming at the alarm device with a very short interval time of the system, namely, on the premise that the system does not find a situation needing the jitter prevention, the jitter preventing system is not started, which can avoid waste of resources of the system, thereby promoting the efficiency of the system, and overcoming the problems of the related technologies that: the jitter preventing system starts a timer and related devices when the system is initially started, and under a condition that the set timing period is very short, the cycle timer takes up a lot of resources of the system, which influences normal operation of other modules.

Thus it can be seen that the above example provides an adaptive jitter preventing method, which is applied to the ASON system. The method can implement a targeted adaptive selection based on frequency intervals of the reported alarm information supported by different transport planes, and effectively avoids the system exception caused by a lot of alarm jitter information transported by the transport plane.

In conclusion, the embodiments of the disclosure provide a process solution that a control plane can effectively filter out an alarm jitter according to different alarm circumstances when a transport plane transports alarm information to the control plane in a certain network element of a wavelength division system, thereby avoiding that the transport plane reports alarm jitter information to the ASON, enabling the control plane to operate more stably, ensuring the system to correctly process the alarm information, and improving the flexibility and processing capacity of the system.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A process method for preventing an alarm jitter, applied to an Automatic Switched Optical Network (ASON) system, wherein the process method comprises:
   obtaining a time interval weight T between a generation and a recovery of an alarm of a device through a pretest;
   comparing the time interval weight T with a predetermined standard time interval W of the device, and determining an alarm jitter processing policy to be adopted according to a magnitude relation between the time interval weight T and the standard time interval W, wherein the alarm jitter processing policy comprises performing a jitter preventing process for alarm information reported by a lower layer according to a priority and/or a type of an alarm; and
   performing the jitter preventing process by using the alarm jitter processing policy.

2. The method according to claim 1, wherein under a condition that the time interval weight T is greater than the standard time interval W, the alarm jitter processing policy comprises:

after receiving a generation alarm or a recovery alarm reported by the lower layer, periodically detecting in a first preset time whether there is new alarm information, which is from a same source as the generation alarm or the recovery alarm, reported by the lower layer;

if so, performing the jitter preventing process according to a priority and/or a type of the new alarm information; or else, not performing the jitter preventing process.

3. The method according to claim 1, wherein under a condition that the time interval weight T is less than or equal to the standard time interval W, the alarm jitter processing policy comprises:

calculating a time interval K between receiving a recovery alarm reported by the lower layer and receiving a next generation alarm;

under a condition that the time interval K is less than the time interval weight T, determining that there is an alarm jitter in the device, and after determining that there is the alarm jitter, detecting in a second preset time whether there is new alarm information, which is from a same source as a generation alarm or the recovery alarm, reported by the lower layer;

if so, performing the jitter preventing process according to a priority and/or a type of the new alarm information.

4. The method according to claim 2, wherein the step of performing the jitter preventing process according to the priority and/or the type of the new alarm information comprises:

when continuously receiving generation alarms or recovery alarms, which are from a same source and reported by the lower layer, with a same type, not reporting the generation alarms or the recovery alarms;

when continuously receiving the generation alarms or the recovery alarms, which are from a same source and reported by the lower layer, with different priorities and different types, if the priority of the received new alarm information reported by the lower layer is higher than that of a generation alarm or a recovery alarm reported to an upper layer a previous time, reporting the new alarm information to the upper layer.

5. The method according to claim 2, wherein the step of performing the jitter preventing process according to the priority and/or the type of the new alarm information further comprises:

when receiving the recovery alarm which is from a same source as the generation alarm after receiving the generation alarm reported by the lower layer, after the detecting is finished, if the new alarm information, which is reported by the lower layer, received the last time is the generation alarm, reporting the new alarm information to an upper layer; if the new alarm information, which is reported by the lower layer, received the last time is the recovery alarm, reporting the new alarm information to the upper layer under a condition that the priority of the new alarm information is higher than that of the generation alarm or the recovery alarm reported to the upper layer a previous time;

when receiving the generation alarm which is from a same source as the recovery alarm after receiving the recovery alarm reported by the lower layer, after the detecting is finished, if the new alarm information, which is reported by the lower layer, received the last time is the recovery alarm, reporting the new alarm information to the upper layer; if the new alarm information, which is reported by the lower layer, received the last time is the generation alarm, reporting the new alarm information to the upper layer under a condition that the priority of the new alarm information is higher than that of the generation alarm or the recovery alarm reported to the upper layer a previous time.

6. The method according to claim 1, wherein the lower layer reports the alarm information in at least one of the following ways:

the lower layer continuously reporting generation alarms or recovery alarms, which are from a same source, with a same type in a preset time interval;

the lower layer continuously reporting the generation alarms or the recovery alarms, which are from the same source, with different priorities and different types in a preset time interval;

the lower layer alternately reporting the generation alarm and the recovery alarm which are from the same source in a preset time interval.

7. A process apparatus for preventing an alarm jitter, applied to an Automatic Switched Optical Network (ASON) system, wherein the process apparatus comprises:

an obtaining module, which is configured to obtain a time interval weight T between a generation and a recovery of an alarm of a device through a pretest;

a comparing module, which is configured to compare the time interval weight T with a predetermined standard time interval W of the device;

a determining module, which is configured to determine an alarm jitter processing policy to be adopted according to a comparison result of the comparing module, wherein the alarm jitter processing policy comprises performing a jitter preventing process for alarm information reported by a lower layer according to a priority and/or a type of an alarm; and a jitter preventing module, which is configured to perform the jitter preventing process by using the alarm jitter processing policy determined by the determining module.

8. The apparatus according to claim 7, wherein under a condition that the time interval weight T is greater than the standard time interval W, the jitter preventing module comprises:

a first detecting module, which is configured to, after receiving a generation alarm or a recovery alarm reported by the lower layer, periodically detect in a first preset time whether there is new alarm information, which is from a same source as the generation alarm or the recovery alarm, reported by the lower layer; if so, perform the jitter preventing process according to a priority and/or a type of the new alarm information; or else, not perform the jitter preventing process.

9. The apparatus according to claim 7, wherein under a condition that the time interval weight T is less than or equal to the standard time interval W, the jitter preventing module comprises:

a calculating module, which is configured to calculate a time interval K between receiving a recovery alarm reported by the lower layer and receiving a next generation alarm;

a deciding module, which is configured to, under a condition that the time interval K is less than the time interval weight T, decide that there is an alarm jitter in the device;

a second detecting module, which is configured to, after deciding by the deciding module that there is the alarm jitter, detect in a second preset time whether there is new alarm information, which is from a same source as a generation alarm or the recovery alarm, reported by the lower layer; if so, perform the jitter preventing process according to a priority and/or a type of the new alarm information.

10. The apparatus according to claim 8, wherein being from the same source means being from a same port of a same single board.

11. The method according to claim 3, wherein the step of performing the jitter preventing process according to the priority and/or the type of the new alarm information comprises:
when continuously receiving generation alarms or recovery alarms, which are from a same source and reported by the lower layer, with a same type, not reporting the generation alarms or the recovery alarms;
when continuously receiving the generation alarms or the recovery alarms, which are from a same source and reported by the lower layer, with different priorities and different types, if the priority of the received new alarm information reported by the lower layer is higher than that of a generation alarm or a recovery alarm reported to an upper layer a previous time, reporting the new alarm information to the upper layer.

12. The method according to claim 3, wherein the step of performing the jitter preventing process according to the priority and/or the type of the new alarm information further comprises:
when receiving the recovery alarm which is from a same source as the generation alarm after receiving the generation alarm reported by the lower layer, after the detecting is finished, if the new alarm information, which is reported by the lower layer, received the last time is the generation alarm, reporting the new alarm information to an upper layer; if the new alarm information, which is reported by the lower layer, received the last time is the recovery alarm, reporting the new alarm information to the upper layer under a condition that the priority of the new alarm information is higher than that of the generation alarm or the recovery alarm reported to the upper layer a previous time;
when receiving the generation alarm which is from a same source as the recovery alarm after receiving the recovery alarm reported by the lower layer, after the detecting is finished, if the new alarm information, which is reported by the lower layer, received the last time is the recovery alarm, reporting the new alarm information to the upper layer; if the new alarm information, which is reported by the lower layer, received the last time is the generation alarm, reporting the new alarm information to the upper layer under a condition that the priority of the new alarm information is higher than that of the generation alarm or the recovery alarm reported to the upper layer a previous time.

13. The apparatus according to claim 9, wherein being from the same source means being from a same port of a same single board.

* * * * *